United States Patent [19]

Petrisko et al.

[11] Patent Number: 5,851,403
[45] Date of Patent: Dec. 22, 1998

[54] CERAMIC HONEYCOMB AND METHOD

[75] Inventors: Robert A. Petrisko, Gilbert, Ariz.;
Gary Lee Stark, Midland, Mich.;
Daniel R. Petrak, Sanford, Mich.;
Richard E. Jones, Midland, Mich.

[73] Assignee: Northrop Grumman Corporation, Los Angeles, Calif.

[21] Appl. No.: 869,045

[22] Filed: Jun. 4, 1997

Related U.S. Application Data

[62] Division of Ser. No. 368,786, Jan. 4, 1995, abandoned.

[51] Int. Cl.$^6$ .......................... B01D 15/00; B01D 53/02
[52] U.S. Cl. ........................ 210/670; 95/141; 95/148; 210/679; 210/694
[58] Field of Search ........................ 210/670, 679, 210/694; 95/141, 148; 264/29.7; 428/116

[56] References Cited

U.S. PATENT DOCUMENTS

| | | | |
|---|---|---|---|
| 4,617,072 | 10/1986 | Merz | 156/89 |
| 4,720,713 | 1/1988 | Chang et al. | 343/912 |
| 4,824,711 | 4/1989 | Cagliostro et al. | 428/116 |
| 4,966,611 | 10/1990 | Schumacher et al. | 95/141 |
| 5,078,818 | 1/1992 | Han et al. | 156/89 |
| 5,079,064 | 1/1992 | Forsythe | 428/131 |
| 5,089,455 | 2/1992 | Ketcham et al. | 501/104 |
| 5,102,727 | 4/1992 | Pittman et al. | 428/259 |
| 5,188,779 | 2/1993 | Horikawa et al. | 264/62 |
| 5,198,282 | 3/1993 | Baker et al. | 428/114 |
| 5,288,537 | 2/1994 | Corden | 428/116 |
| 5,322,725 | 6/1994 | Ackerman et al. | 428/137 |
| 5,451,444 | 9/1995 | De Liso et al. | 428/116 |

*Primary Examiner*—Ivars Cintins
*Attorney, Agent, or Firm*—Terry J. Anderson; Karl J. Hoch, Jr.

[57] ABSTRACT

Conductive and/or chemically absorptive ceramic fibers are woven with optional non-conductive/non-absorptive ceramic fibers to create a fiber reinforcement which is impregnated with a ceramic-material-producing (pre-ceramic polymer) binder and heated to create the ceramic honeycomb with controlled ohmic loss and/or chemical absorption properties. The desired properties of the honeycomb material can be provided by the conductive and/ absorptive ceramic fibers alone or in combination with non-fibrous or fibrous conductive and/or absorptive ceramic material provided by the binder, typically a preceramic polymer which may or may not contain dispersed ceramic materials; after the honeycomb is formed, the non-fibrous or fibrous conductive and/or absorptive ceramic material is interspersed throughout the honeycomb. By heating the impregnated fiber reinforcement in the absence of oxygen, carbon from any carbon-containing materials within the binder remain as a part of the honeycomb material. The honeycomb can be loaded with additional carbon or carbon-containing fibers by repeating the loading and heating in the absence of oxygen steps. For applications requiring long-term thermo-oxidative resistance, refractory ceramics like pure silicon carbide can be substituted for the fibers or fillers employed.

5 Claims, No Drawings

CERAMIC HONEYCOMB AND METHOD

This application is a division of application Ser. No. 08/368,786, filed Jan. 4, 1995, now abandoned.

BACKGROUND OF THE INVENTION

Various industrial applications require structural materials which are capable of extended use at high temperatures (above 600° F.) and have high specific strength, that is high strength-to-weight ratios. One class of such materials is honeycomb. These structures can be compositionally and geometrically tailored to exhibit controlled mechanical, electrical and chemical properties useful in the commercial sector, such as high powered dielectric lenses, filter media, microwave absorbers and small, lightweight electrical heating elements.

Previous attempts to fabricate honeycomb and composites from organic polymer materials suffer from the inability to use the resultant materials at high temperatures. Attempts to use refractory fibers and pre-ceramic polymer-derived ceramic materials in laminated composite form have resulted in compositions of relatively high density and therefore low specific strength. Ceramic foams, which have also been used for these purposes, suffer from low specific strength and do not always allow cooling of the ceramic foam body, especially in deep sections. Applications of these materials as filter media are limited by the large occluded volume they occupy. Most prior art attempts to produce tailored electrical properties have been insufficient because of limitations on geometric placement of the electrically active (e.g., ohmic loss elements) materials within the ceramic body.

SUMMARY OF THE INVENTION

The present invention is directed to ceramic honeycomb with controlled mechanical, electrical and chemical properties which is light in weight, has high specific strength and is capable of use at high temperatures. The ceramic honeycomb, with or without ohmic loss properties, can also be used to remove volatile organic compounds (VOCs) and other materials having an affinity for carbon. The ceramic honeycomb used for this purpose can be regenerated many times by, for example, heating thermally or electrically for maximum efficiency.

The ceramic honeycomb with controlled ohmic loss and chemically absorptive properties includes conductive ceramic fibers and, optionally, non-conductive fabric fibers combined, typically by weaving, to create a fabric reinforcement. The proportion and placement of the conductive and non-conductive ceramic fibers is controlled to achieve the desired conductivity and/or absorptive properties. The fabric reinforcement is impregnated with a pre-ceramic polymer resin to which other ceramic additives may be added. The honeycomb material itself is formed from the impregnated fabric reinforcement.

The ohmic loss properties and/or chemical absorptive properties of the honeycomb material can be provided by the conductive/absorptive ceramic fibers alone or in combination with dispersed conductive/absorptive ceramic materials. This dispersed conductive ceramic material is typically mixed with the pre-ceramic polymer binder containing a liquid ceramic precursor material or a finely divided ceramic material, or both, so that after the honeycomb is formed, which typically includes heating, the added ceramic material is dispersed throughout the honeycomb. The liquid ceramic precursor can be a preceramic polymer dissolved in a liquid vehicle, such as toluene or other common solvents, which may or may not contain a suspension of particulate or fibrous ceramic material, such as silicon carbide, carbon fiber, carbon wiskers, silicon oxycarbide, carbon powder, oxide ceramic precursors such as aluminosilicate sols or non-oxide ceramic precursor polymers such as polycarbosilanes, polysilanes, polysilazanes and polysiloxanes. Examples would include polycarbosilane produced by Nippon Carbon, hydridopolysilazane ("HPZ") produced by Dow Corning, SR-350 polymer produced by General Electric, and methylpolysilanes produced by Union Carbide.

The ohmic loss properties of the honeycomb material may also be provided by judicious choice of thin, refractory coatings on the fibers. For example, carbon or $SnO_2$ coatings on Nicalon™ may be used to impart high loss while silicon nitride or boron nitride may be used for low loss. If such coatings are used, some or all of the fibers may be coated and the placement of these fibers can be controlled. It should be noted that these refractory coatings can also provide improved mechanical properties (such as toughness) to the resulting honeycomb.

By heating the impregnated fiber matrix in the absence of oxygen, carbon from any carbon-containing materials within the binder remains as a part of the honeycomb material. The honeycomb can be loaded up with additional carbon or other refractory fillers by applying these materials to the honeycomb in a suspension form and then heating the honeycomb material in the absence of oxygen to drive off the volatile components but leave the carbon or refractory filler; the application and heating steps can be repeated until the desired amount of carbon has been deposited.

Such a carbon-loaded honeycomb material can find utility both as a ohmic loss electromagnetic radiation absorber and also as a regeneratable filter for removing, for example, volatile organic compounds from a liquid or vapor stream. For the latter purpose, after the carbon-loaded ceramic honeycomb has been exposed to the volatile organic compounds, the contaminated ceramic honeycomb is heated in the presence of oxygen to burn off both the carbon and the VOCs, thus regenerating the ceramic honeycomb. The carbon loading, VOC exposing and heating steps can be repeated a number of times to prolong the useful life of the ceramic honeycomb.

Other features and advantages of the invention will appear from the following description in which the preferred methods have been set forth in detail.

DETAILED DESCRIPTION OF THE PREFERRED METHODS

Honeycomb material can be made in two basic ways. The first is to take sheets or webs of material, which have typically been preimpregnated with a suitable resin, and corrugate the webs into half honeycomb shapes. The high points or nodes on the webs are then bonded to the high points or nodes on adjacent webs to create the honeycomb cavities, typically four or six sided. Alternatively, a flat sheet can be secured between the corrugated ribbons to create the cavities. Another way to create honeycomb is to take flat sheets and put glue lines between each sheet at staggered places. After doing so, the stack of sheets are then expanded to create expanded honeycomb material.

Various techniques for making honeycomb are disclosed in U.S. Pat. No. 5,312,511 to Fell titled Apparatus for the Preparation of Thermoplastic Honeycomb, the disclosure of which is incorporated by reference. U.S. Pat. No. 5,078,818 to Jong H. Han titled Method for Producing a Fiber- Reinforced Ceramic Honeycomb Panel discloses the manufacture of fiber-reinforced ceramic honeycomb by the use of a liquid impregnant which is convertible to a ceramic material upon exposure to elevated temperatures.

With the present invention, webs of material are made of fabric woven from fibers, at least some of which are ceramic fibers. The ceramic fibers can be, for example, carbon fibers, Nicalon™ ceramic-grade or low volume resistivity grade silicon oxycarbide fibers, made by Nippon Carbon Co. of Japan, Nextel™ aluminosilicate fibers, made by 3M Corporation of Minnesota, HPZ ceramic fibers made by Dow Corning, silicon carbide fibers produced by Dow Corning, or graphite fibers made by various manufacturers. For chemical absorptive applications, the used high surface area carbon fiber is preferred. All of these can be woven with other electrically conductive or absorptive ceramic fibers or with non-conductive and/or non-absorptive ceramic fibers. If desired, the conductive ceramic fibers can be non-uniformly woven into the web of material so that the electrical conductivity along one portion of the web differs from that along another portion of the web. One way for doing so is disclosed in U.S. Pat. No. 5,102,727 to Pittman et al. titled Electrically Conductive Textile Fabric Having Conductivity Gradient, the disclosure of which is incorporated by reference. A further method of doing so, which permits graded conductivity from one or more baselines on the fabric for electromagnetic radiation having polarizations in two perpendicular directions, is disclosed in U.S. patent application Ser. No. 08/368,769 entitled Graded EMR-Conductive Material and Method for Making, and filed on the same day as this application, the disclosure of which is incorporated by reference.

The fabric can be made by methods other than weaving, such as felting, paper-making or yarn placement methods. The non-conductive ceramic fibers can be one or more of a variety of fibers such as Nextel™, aluminosilicate fiber, MPZ silicon oxynitride fibers, Almax™ alumina fibers, or the like. The choice of the non-conductive ceramic fibers will often be dictated by a desired flexibility of the fabric, the fabric strength, weight, cost, and other such considerations. Preferably the proportions of conductive to non-conductive ceramic or graphite fibers are in the range of 1-to-10 to 1-to-1000, that is 10% conductive ceramic or graphite fibers to 0.10% conductive ceramic fibers with the remaining 99.9% being non-conductive ceramic or graphite fibers.

In one embodiment, 900 denier rovings of Nicalon™ Ceramic grade SIC fibers (Nippon Carbon Company, Yokohama Japan, distributed by the Dow Corning Corporation) were woven into a plain weave, 4 oz./yd$^2$. This fabric is approximately 50% lower in areal weight than commercially available forms derived from 1800 denier roving. Fabrics of this type are especially useful in providing an open weave architecture in the resultant honeycomb desirable for filter applications.

The fabric was then impregnated with a pyrolyzable binder consisting of, for example, a phenolic resin to which powdered silicon carbide particles, or other ceramic particles or fibers, were, but are not required to be, added. Upon impregnation, the resulting prepreg fabric can be corrugated into the half honeycomb shape and bonded together using standard polymer node adhesives which char to useful compositions or preceramic polymer-based adhesives; a preceramic adhesive similar to the composition of the prepreg media can be used if the node line expansion method is employed. Conventional techniques for creating "green body" honeycomb took place by heating the bonded sheet honeycomb material to about 350° F. for about one hour which caused the phenolic resin, or other binder, to solidify to form a stable honeycomb shape. The green body honeycomb was then pyrolyzed under a nitrogen atmosphere (oxygen excluded) for several hours at temperatures up to 1200° C. The pyrolyzed honeycomb was again infiltrated with the ceramic matrix/binder solution followed by pyrolysis 2–10 times to control the density of the resulting pyrolyzed ceramic honeycomb. Pyrolyzed ceramic honeycomb which underwent pyrolysis 8 times had a density of 5 pounds per cubic foot for a ⅜" cell size and a density of 9 pounds per cubic foot for a 3/16" cell size. If desired, the ohmic loss properties, which in the above example arose from the use of conductive ceramic fibers and carbon left over from the pyrolysis of the phenolic resin in an oxygen-excluded atmosphere, could be tailored by further processing of the pyrolyzed ceramic honeycomb in an oxygen containing atmosphere to lower the residual carbon content and thus decrease the ohmic loss character in a controlled fashion.

An alternative to the above example would be to substitute a pre-ceramic polymer for the phenolic resin used as the binder for the green body. In this manner, the ultimate ohmic loss characteristics of the pyrolyzed ceramic honeycomb would be controlled by the electrical conductivity inherent in the ceramic fibers used, the composition of the ceramic matrix derived from the preceramic polymer binder and/or the nature of the fillers employed during the impregnation and/or reimpregnation steps, both followed by pyrolysis. For example, flat sheets of prepreg formed from Nicalon ceramic-grade cloth was impregnated with a mixture of silicon carbide powder in a poly carbosilane-type preceramic polymer (polycarbosilane made by Nippon Carbon, Ltd. of Japan), pyrolyzed at 1200° C. for one hour in a non-oxygen-containing environment and reimpregnated and pyrolyzed eight more times. The pyrolyzed, reimpregnated sheets, which serve as precursors for the individual ribbons or webs of the honeycomb, exhibited high dielectric loss but a greatly improved resistance to secondary oxidation and reduction of ohmic loss due to oxidation. Thus, an oxidatively thermally stable version of the pyrolyzed ceramic honeycomb resulted.

Modifications and variations to the disclosed method can be made without departing from the subject invention as defined in the following claims.

What is claimed is:

1. A method for removing substances having an affinity for binding with carbon comprising the following steps:

loading a ceramic honeycomb with carbon to get carbon-loaded ceramic honeycombs the loading step comprising:
  i) applying a loading material comprising a carbon component and a heat-sensitive volatile component;
  ii) heating the honeycomb with the loaded material applied thereto in an oxygen-excluded environment to drive off the volatile component, leaving the carbon from the carbon component;

exposing the carbon-loaded ceramic honeycomb to a fluid containing a substance having an affinity for binding with carbon causing said substance to combine with the carbon of the carbon-loaded ceramic honeycomb to create a contaminated ceramic honeycomb;

heating the contaminated ceramic honeycomb in the presence of oxygen to burn off the carbon and the substance combined with the carbon;

repeating the loading, exposing and heating steps.

2. The method according to claim 1, wherein the loading step is carried out using ceramic honeycomb comprising at least one of ceramic fibers and graphite fibers.

3. The method according to claim 1, wherein the applying step is carried out using a loading material selected from the group consisting of:

phenolic resin or phenolic resin filled with graphite fiber, graphite particles or carbon particles.

4. The method according to claim 1, wherein the applying and heating steps take place at least twice during each loading step.

5. The method according to claim 1, wherein the exposing step includes the step of exposing the carbon-loaded ceramic honeycomb to a gas containing a volatile organic compound.

* * * * *

UNITED STATES PATENT AND TRADEMARK OFFICE
CERTIFICATE OF CORRECTION

PATENT NO. : 5,851,403
DATED : December 22, 1998
INVENTOR(S) : Robert A. Petrisko, Gary Lee Stark, Daniel R. Petrak and Richard E. Jones It is certified that error appears in the above-identified patent and that said Letters Patent is hereby corrected as shown below:

ON THE TITLE PAGE:

Item [73] Assignee:

Northrop Grumman Corporation, Los Angeles, Calif.
Dow Corning Corporation, Midland, Michigan Signed and Sealed this Thirteenth Day of June, 2000

Attest:

Q. TODD DICKINSON

*Attesting Officer*         *Director of Patents and Trademarks*